United States Patent Office 3,778,343
Patented Dec. 11, 1973

3,778,343
DEVICE FOR PLASMA CONFINEMENT AND HEATING BY HIGH CURRENTS AND NON-CLASSICAL PLASMA TRANSPORT PROPERTIES
Bruno Coppi, Winchester, and Donald B. Montgomery, Wayland, Mass., assignors to the United States of America as represented by the United States Atomic Energy Commission
Filed Mar. 11, 1971, Ser. No. 123,319
Int. Cl. G21b 1/00
U.S. Cl. 176—3
11 Claims

ABSTRACT OF THE DISCLOSURE

Toroidal plasma containment device having means for inducing high total plasma currents and current densities and at the same time enhanced plasma heating, strong magnetic confinement, high energy density containment, magnetic modulation, microwave-induced heating, and diagnostic accessibility.

BACKGROUND OF THE INVENTION

This invention was made in the course of, or under a contract with the United States Atomic Energy Commission.

In the field of plasma physics, various devices have heated and magnetically confined plasmas of ions and electrons in a column away from the inside walls of vacuum chambers, as illustrated by the construction and use by Princeton University of the stellarators described in "Project Sherwood—The U.S. Program in Controlled Fusion," by Amasa Bishop, Addison-Wesley Publishing Company, 1958, and/or U.S. Pats. 3,002,912; 3,012,955; 3,015,618; 3,016,341; 3,088,894; 3,171,788; and/or 3,278,384. While these stellarators have been useful to the understanding of basic plasma phenomena, the heating means used heretofore has been slow or has heated the plasma to temperatures far below the thermonuclear ignition temperatures due to a lack of adequate confinement and inability to sustain a sufficiently high total plasma current and current density. Also in the plasma confinement devices of high performance known heretofore, the magnetic confining fields have been relatively weak (i.e., below about 35 kg. for extensively operated toroidal facilities). Additionally, these structures have often allowed the onset of instabilities and other plasma effects leading to the loss of confinement.

It is an object of this invention, therefore, to overcome the heretofore known confinement heating difficulties by providing high currents and current densities so as to enhance the plasma resistivity over that resulting from the effects of electron collisions; the resistivity enhancement resulting from magnetic field modulation which produces trapping of part of the electron population and from a weak turbulence that is caused by the strong current density inside the plasma.

It is also an object of this invention to:

(1) confine a current carrying plasma in a very strong precise magnetic field produced by improved magnet means;
(2) provide high total plasma currents for confining high energy density plasmas by realizing a toroidal plasma column with low ratio of its major radius to its minor radius;
(3) provide the possibility for inducing plasma turbulence and heating by injection of microwaves.

SUMMARY OF THE INVENTION

This invention provides means for enhancing the plasma resistivity of a diffused pinch and speeding up heating and providing plasma stability therein. Accordingly, this invention is aimed at confining a toroidal plasma column having a large plasma current density in a strong magnetic confining field of at least 100 kilogauss that is produced by high strength magnet means around the entire plasma section in an evacuated chamber. More particularly, this invention contemplates a diffused plasma pinch configuration in a plasma container, hereinafter referred to as an Alcator, having means for producing strong magnetic fields having a high degree of symmetry, a favorable aspect ratio $R/a$, high values of current density, and a resistivity which is larger than the so-called classical one, due to electron-ion collisons and represented by the Spitzer formula. This formula gives a plasma resistivity approximately equal to $2.5 \times 10^{-6}/T_e^{3/2}$ ohm-centimeter, where $T_e$ is the electron temperature expressed in kiloelectron volts. To this end, there is provided in one embodiment a specific high current carrying toroidal plasma column forming a diffused pinch configuration with a kinetic pressure smaller than or equal to the magnetic pressure produced by the plasma current, and wherein the plasma current density produces a mild plasma turbulence at such a level that it does not destroy the plasma configuration itself but is sufficient to produce interactions between the plasma particles and collective plasma resistivity larger than that of the classical Spitzer formula. In addition, the electrical resistivity in high temperature toroidal plasmas can become larger than the one given by the classical Spitzer formula by virtue of the separation of the electron population into circulating electrons and trapped electrons in the spatially varying toroidal magnetic field. The fact that the current is carried only by the circulating electrons and that these interact with the trapped electrons and the ions results in resistivity enhancement. In order to achieve the beforesaid goals, special low temperature magnet means are provided for producing a strong, precise, axial magnetic confining field. In another aspect, this invention provides an improved method for confining, heating and diagnosing a plasma. With the proper selection of the components and their operation, the desired plasma heating and confinement for purposes of research and diagnostics and/or controlled thermonuclear reactions are achieved.

The above and further novel features and objects of this invention will be understood in more detail from the following detailed description when the same is read in connection with the accompanying drawings, and the novel features will be pointed out in the attached claims.

BRIEF DESCRIPTION OF THE DRAWINGS

In the figures, where like elements have like reference numbers.

In the explanation to follow there is first a brief overall discussion of the Alcator device, then an in-depth exposition of the theory underlying the inventive concept herein disclosed, and then a more detailed explanation of the apparatus. In the explanation the term "annulus," and variations thereof, and "torus," and variations thereof, are used interchangeably to describe a ring-shaped or circular structure having a major radius R and a minor radius $a$. It should be kept in mind, however, that the term toroidal is broader than the term annular.

The present disclosure, as above mentioned, relates to a high magnetic field toroidal plasma device intended to realize physical regimes in which thermonuclear reactions in a controlled form can occur. The basic functioning of the Alcator apparatus is that of diffused pinch with plasma kinetic pressure smaller than the magnetic pressure. Apparatus of this kind has been investigated heretofore in the U.S.S.R. and called tokamak; see, for example, a journal article by Artsimovich et al. in Atomnaya Energiya, 22, 325 (1967) and a further journal article by Artsimovich et al. in Plasma Physics and Controlled Thermonuclear Fusion, vol. I, p. 543. Alcator differs, however, in many important respects from the Russian devices, a number of those differences are mentioned herein.

Figure 6:
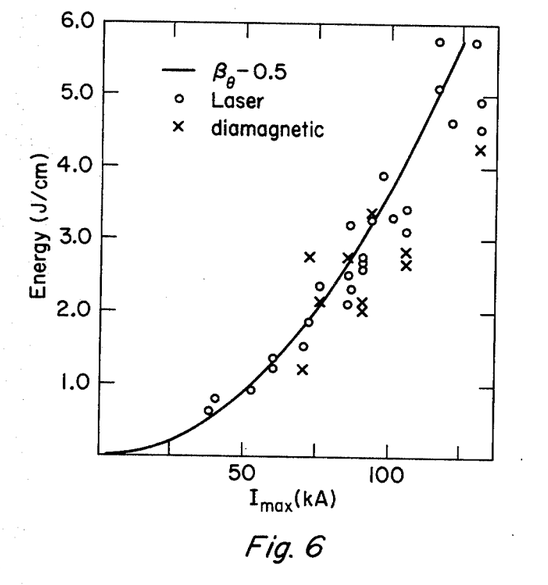
FIG. 6 is a graph of experimental values of $I_{max}$. v. Energy and confirms that the energy in the tokamak devices is proportional to $I^2$, a fact which was predicted well before the results of a relevant experiment were reported and used as a basis for the design of Alcator.

One of the basic discoveries underlying the Alcator project was the finding and utilization of what is termed "non-classical resistivity." Prior to that discovery it was thought that plasma resistivity in a toroidal plasma confined in strong magnetic fields and where the electron flow velocity that is equal to the current density divided by the particle density, is smaller than the electron thermal velocity was well represented by the above-mentioned Spitzer formula (see "Physics of Fully Ionized Gases," by Lyman Spitzer, Jr., Interscience Publ., 1956), a condition which would render fusion possibilities of apparatus of the Alcator-type considerably more difficult. In other words, it has been found that interactions between particles and collective effects generating a turbulent (also called "anomalous" herein) resistivity increase as the current density increases, as shown in FIG. 6. (The current density $j$ is proportional to $B_T/R$, where $B_T$ is the containing magnetic field magnitude, as later discussed, and R is the major radius of the containing annulus, as before mentioned.) Thus, Alcator has been designed with the object of attaining the largest possible total current and current density at the same time. It is also important to consider that the total energy density of the contained plasma is proportional to the square of the magnetic field ($B_p$ herein) generated by the plasma current and that the plasma heating time decreases at least as the square of the plasma current density. These aims are attainable in Alcator by optimization of the toroidal magnetic field $B_T$ (due to external conductors) and the geometrical characteristics of it.

The discussion herein relates to apparatus and method of operation of such apparatus in order to attain regimes in which controlled nuclear fusion processes can occur (e.g. deuterium gas is fused to form helium within a manageable environment). By way of brief overall explanation, the deuterium gas is placed at a reduced pressure within an annular cavity 8; it is made slightly conductive by an ionization process, later discussed herein, to form a plasma; and it is then subjected to heating in a magnetic field by the current induced by an air-core transformer 15 located within the central hole, labeled 25, of the torus. The gas is heated by the electric current flow, the rate of heating and ultimate temperature being a function of the plasma current density (or more accurately, current density and plasma resistance, as more particularly discussed hereinafter). The annular plasma thereby formed is maintained in the annular form by the containing field $B_T$ provided by a toroidal coil 1 made of Bitter-plates 3; the poloidal field $B_p$ is generated by the electric current within the plasma, as is noted above. The field $B_T$, of course, is also annular in shape, being disposed substantially wholely within the toroidal cavity 8, and the field $B_p$ acts substantially orthogonally to the field $B_T$. The aspect ratio (i.e., $R/a$) should be maintained as small as possible for a given magnetic field $B_T$; more particularly, Alcator is a low-aspect ratio device, that is, $R/a < 5$.

Figure 1:
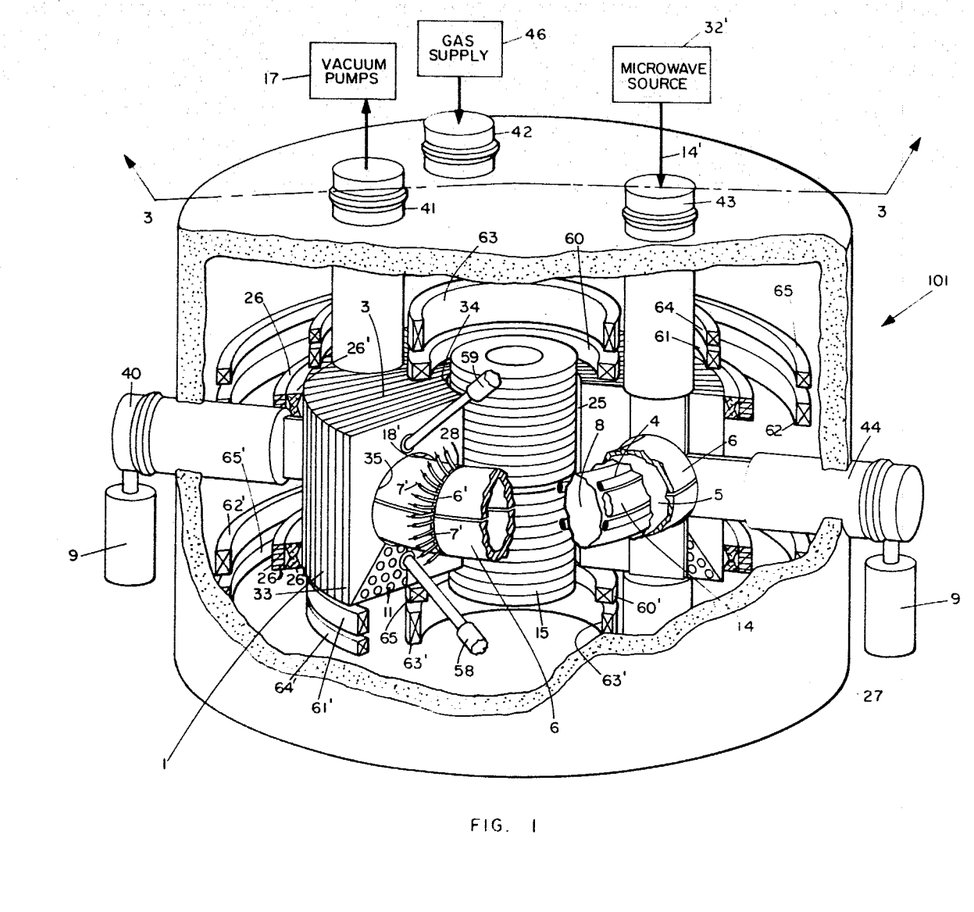
FIG. 1 is a perspective view, partially cutaway, of the main working elements of Alcator, a number of control elements of the system being shown in block diagram form.
Figures 2, 4:
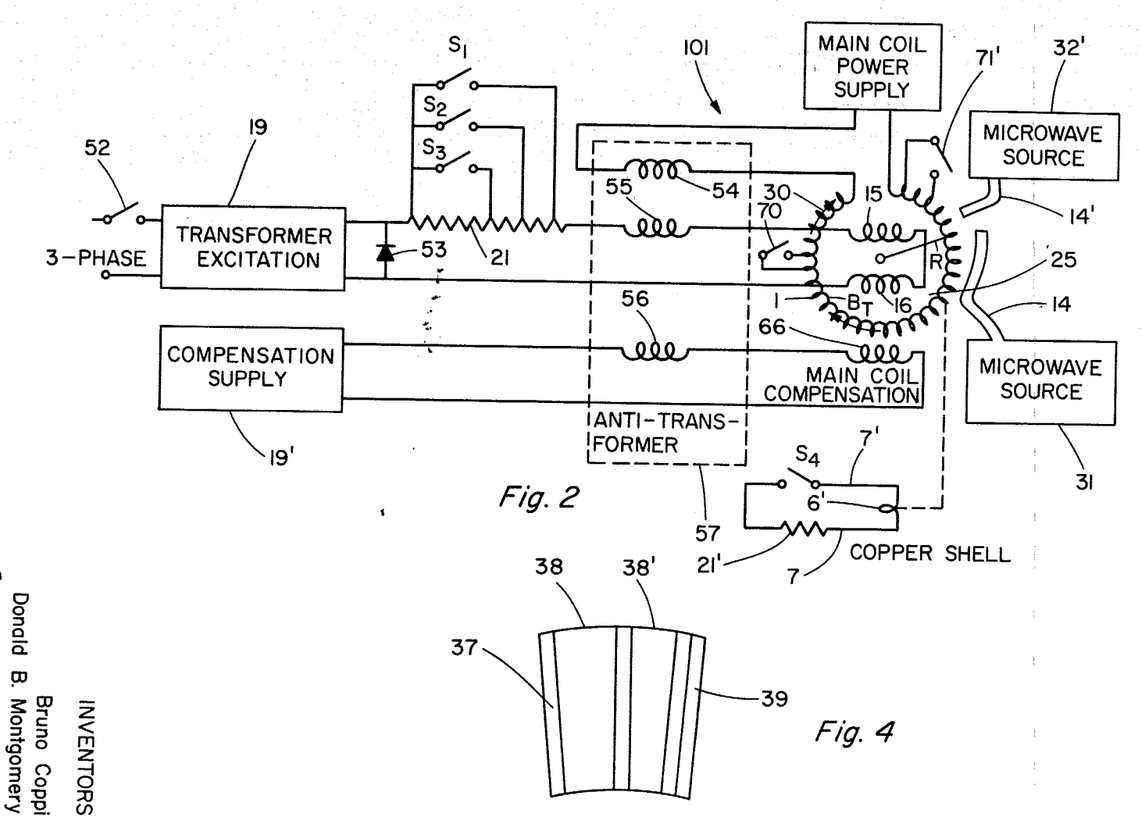
FIG. 2 is a schematic circuit diagram of most of the working elements in FIG. 1 and several not shown in FIG. 1.
FIG. 4 shows a single turn of a Bitter-type coil for the Alcator device.
Figure 3:
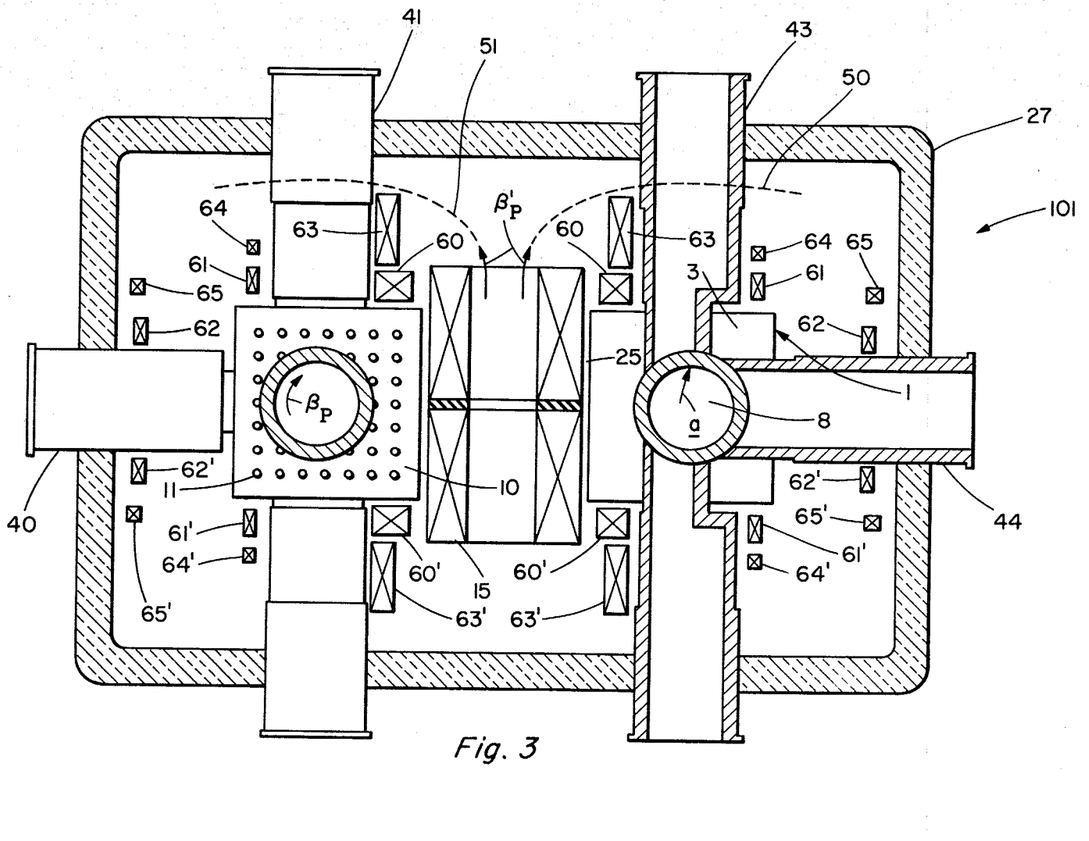
FIG. 3 is schematic section view taken along a vertical plane drawn through the line 3—3 in FIG. 1 looking in the direction of the arrows, the figure being primarily intended to show vertical positioning of various magnetic field coils in Alcator.

This paragraph contains a very brief, oversimplified explanation of some of the elements shown in FIGS. 1–3, and their function. The Alcator apparatus generally, labeled 101 in FIG. 1, comprises the toroidal coil 1 consisting of a plurality of Bitter plates 3 formed into an annular configuration. The coil 1 has a central annular opening or cavity 8 to receive and contain the deuterium gas which forms the plasma and which serves as the fuel in the fusion process. The coil 1 provides the field $B_T$ (see FIG. 2). An air-core transformer 15 (unlike the tokamak devices which use a magnetic steel core) serves to create a current in the gaseous plasma in this way. The coil 15 is energized prior to the experiment by a D-C power supply 19 and is then rapidly discharged by introducing a resistance 21 into the circuit. The rapid discharge creates a large changing magnetic flux linking the gas within the cavity 8. The gas at this juncture is ionized and conductive making it effectively a single turn secondary of a transformer of which the primary is the coil 15. The coil 15 also gives rise to an unwanted field $B_p'$ (see FIG. 3) which must be forced outside the cavity 8 by a plurality of compensation coils 16 connected in series with said coil 15, as later discussed. During the whole operation, of course, the Bitter coil is energized and the field $B_T$ is present. The assembled coil 1 is held together against the tremendous forces caused by the various magnetic fields primarily by a pair of fiber glass stress hoops 26 and a set of aluminum wedges 26', and the whole electrically active portion of Alcator is maintained at cryogenic temperature by a dewar 27. The annular cavity 8 is actually the inner opening of a composite annular tube 28 made of an outer copper stabilizing shell 6 surrounding a stainless steel shell 5. Inside the stainless steel shell, and forming the inner surface defining the cavity 8, there is a thin nonconvoluted, gold-plated Inconel liner 4. The immediately following paragraphs deal with a plasma in an Alcator device in which $B_T$ is 120,000 gauss, R is 54 centimeters and $a$ is 12 centimeters, i.e., a low-aspect ratio device.

A salient feature of high-temperature torodial plasmas with low aspect ratio is that the fraction of trapped particles, $$\frac{n_T}{n_o} = \left(1 - \frac{B_{min.}}{B_{max.}}\right)^{1/2} \qquad (1)$$

where $B_{min.}$ and $B_{max.}$ are the minimum and maximum magnetic field values along a given line of force, can be quite large, as much as 60% in the Alcator experiment. More specifically, the magnetic field is given by $$B = B_o/(1 + x \cos \theta)$$

$$B_{max.} = \frac{B_o}{1-x}$$

and $$B_{min.} = \frac{B_o}{1+x}$$

where $B_o$ is the field value on the magnetic axis, $x$ is the ratio of the radius of a considered magnetic surface to the torus major radius, and $\theta$ is the poloidal angle. So, $$\frac{n_T}{n_o} = \left(\frac{2x}{1+x}\right)^{1/2} \quad (2)$$

and the average over the plasma cross section is $$\overline{\left(\frac{n_T}{n_o}\right)} = 2A^2 \int_0^{1/A} \left(\frac{2x}{1+x}\right)^{1/2} x\,dx \quad (3)$$

where $A$ is the aspect ratio. In the case of Alcator, $A \approx 4.5$ and $$\overline{(n_T/n_o)} \approx 49\%$$

From Eq. 3 it can be seen that $\overline{(n_T/n_o)}$ is given with fairly good accuracy by the lowest order term in $x$ inside the integral. That is, $$\overline{\left(\frac{n_T}{n_o}\right)} \approx \frac{4}{5}\left(\frac{2}{A}\right)^{1/2}\left(1 - \frac{5}{14}\frac{1}{A} - \cdots\right) \quad (4)$$

while $$\frac{n_T(x=A^{-1})}{n_o} = \left(\frac{2}{A}\right)^{1/2}\left(1 - \frac{1}{2A} - \cdots\right)$$

Consequently, better accuracy is expected from an expansion in $1/A$ of transport coefficients that depend on the number of trapped particles, when considering their average over the area, than their average value over an outer magnetic surface corresponding to $x \approx 1/A$.

At high temperatures, the electric field $E_{\parallel}$ applied along the torus to drive an ohmic heating current is small, since this current is bounded by the Kruskal-Shafranov limit. Thus the energy gained by a particle in its motion under the influence of $E_{\parallel}$ once around the torus is negligible in comparison with its thermal energy. Consider in particular regimes wherein the electron average collision frequency is well below the value of the average bounce frequency of the electrons trapped in the magnetic field. Then the current is carried by the circulating (untrapped) electrons and the resisitivity is provided by their loss of momentum to the ions and to the trapped electrons. It is assumed that the average number of circulating electrons that became trapped, as a consequence of electron-electron collisions, will be equal to the number of trapped electrons that became circulating, and that the average momentum loss to the trapped electrons is ⅓ of that lost to the ions in an equal number of collisions.

Therefore the momentum balance equation for circulating electrons can be written as $$0 = n_c e E_{\parallel} + m_e n_o \bar{\nu}_{e\parallel}\left[1 + \frac{1}{3}\left(\frac{\overline{n_T}}{n_o}\right)\right] u_{e\parallel} \quad (5)$$

Here $$n_c = n_o\left[1 - \left(\frac{\overline{n_T}}{n_o}\right)\right]$$

$u_{e\parallel}$ is the flow velocity for the circulating electrons and $\nu_{e\parallel}$ is the collision frequency taking into account that the current results from a displacement of and a distortion of a Maxwellian distribution in the direction of the electric field $E_{\parallel}$. Therefore $$\bar{\nu}_{e\parallel} = \bar{\eta}_{Sp}\frac{e^2 n_o}{m_e}$$

where $\eta_{Sp}$ is the average Spitzer resistivity. The average current density is evidently $$J_{\parallel} = -e n_c u_{e\parallel}$$

and the average resistivity $$\bar{\eta}_e = \frac{E_{\parallel}}{J_{\parallel}}$$

Therefore $$\bar{\eta} \approx \bar{\eta}_{Sp}\frac{1 + \frac{1}{3}\left(\frac{\overline{n_T}}{n_o}\right)}{1 - \frac{\overline{n_T}}{n_o}} \quad (6)$$

and in the case of Alcator $$\bar{\eta} \approx 2.6\bar{\eta}_{Sp}$$

Since, under constant current conditions, $$\bar{\eta}_{\parallel} J_{\parallel}$$

is the ohmic heating power density, the presence of trapped particles can give it an important enhancement and reduce the heating time.

A more careful approach to the problem of transport coefficients in a varying magnetic field configuration is given by the so-called neoclassical transport theory that has been developed in the limit $n_T/n_o \ll 1$ corresponding to $(2x)^{1/2} \ll 1$. On the other hand, the numerical results of this theory cannot be extended to a case wherein $x \approx 1/A$ and $A \approx 4.5$, as in Alcator, since $n_T/n_o$ is then a bad expansion parameter. The neoclassical electrical conductivity averaged over a given line of force, can evidently be written as $$\sigma_{NC} = \sigma_{Sp}[1 - \alpha_1(2x)^{1/2} - \alpha_2(2x) \ldots]$$

and, when considering its average over the area of the magnetic surface cross section, $$\bar{\sigma}_{NC} \approx \sigma_{Sp}\left[1 - \frac{4}{5}\alpha_1\left(\frac{2}{A}\right)^{1/2} - \frac{2}{3}\alpha_2\frac{2}{A}\cdots\right] \quad (7)$$

under the assumption that the temperature $T_e$, and therefore $\sigma_{Sp}$, is constant over the cross section. Now the value of $\alpha_1$, as obtained by Rosenbluth (lecture of the International Center for Theoretical Physics, Trieste, July 1970) is about 1.35, which be compared with 1.33 as obtained from Eq. 6, but used in Eq. 7 would lead to $\sigma_{Sp}/\sigma^N{}_C \approx 3.5$ for $A=4.5$, and $\alpha_2=0$.

An important matter to be taken into account in assessing the expected resistivity is the presence of fluctuations and, in particular, of current-induced fluctuations. A resistivity results from the loss of momentum by the circulating electrons to the wave by inverse Landua damping and loss of momentum by the wave to the ions and the trapped electrons.

It can be seen that in the regimes of interest $u_{e\parallel}$ as defined by Eq. 5 is well below the electron thermal velocity. Also, the ion temperature $T_i$ is expected to be not much smaller than the electron temperature $T_e$. It is then possible to rule out the presence of ion sound waves. Hence, by exclusion, the fluctuations of interest are due to drift-like modes or possibly to trapped particle modes. In what follows, the threshold velocity above which resistivity induced by fluctuations sets in is called $u_{thr}$ and the ion sound-wave velocity $v_s = (T_e/m_i)^{1/2}$ is considered as a numerical reference value. The maximum current density is fixed by magnetic and geometric characteristics of the confinement configuration and, for a circular cross section, $$j_{\parallel} \approx \epsilon \frac{B_o}{R} \quad (8)$$

Here $j_{\parallel}$ is in a./cm.$^2$, $B_o$ in gauss, R in cm., and $$0.64 \leq \epsilon \leq 0.8$$

for a safety factor $2 \leq q_o \leq 2.5$.

Figure 7:
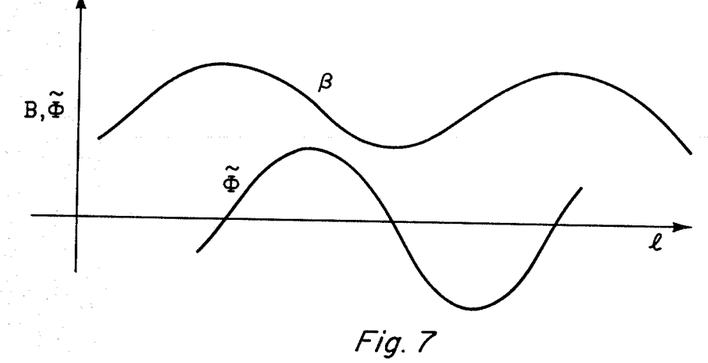
FIG. 7 is a graph of typical electrostatic potentials of low-frequency modes arising in a configuration with varying magnetic field.

To illustrate how $u_{thr}$ can be found in the present case and the resistivity evaluated, the electron population is taken to be composed of two species, trapped ones and circulating ones, both represented by a Maxwellian distribution with temperature $T_e$ displaced from each other by $u_{e\parallel}$. In order to consider current-driven driftlike modes, the realistic configuration is mocked up by a one-dimensional slab. Referring to FIG. 7, it can be seen that driftlike modes are characterized by odd electrostatic potentials along a given magnetic field line, as indicated; $l$ in the figure measures the distance along a given magnetic field line. Then, in the slab geometry with the magnetic field along the z-direction, normal mode solutions take the form $$\phi = \tilde{\phi}(x_o) \exp(ik_y y + ik_\| z + i\omega t)$$

FIG. 7. The frequencies $\omega$ are considered such that where $k_\|$ is intended to represent the situation shown in $k_\| v_{thi} < \omega < k_\| v_{the}$ and it follows that $$\tilde{n}_{eC} = \frac{e}{T_e} n_c \tilde{\phi} \left[ 1 - i(\omega - \omega_* + k_\| u_{e\|}) \frac{\sqrt{\pi}}{|k_\| | v_{the}} \right]$$

$$\tilde{n}_{eT} = \frac{e}{T_e} n_T \tilde{\phi} \left[ 1 - i(\omega - \omega_*) \frac{\sqrt{\pi}}{|k_\| | v_{the}} \right]$$

where $n_c$ and $n_T$ represent the number density of trapped and circulating particles, respectively, and $$\omega_* = (k_y c T_e/eBn)(dn/dx)$$

is the drift frequency. Similarly, for the ion species, $$\tilde{n}_i = -\frac{e\tilde{\phi}}{T_i} n_i \left\{ 1 - \left(1 - \frac{\omega_{*i}}{\omega}\right) \left[ 1 + \frac{k_\|^2 T_i}{m_i \omega^2} \right. \right.$$
$$\left. \left. + i\sqrt{\pi} \frac{\omega}{|k_\| | v_{thi}} \exp\left(-\frac{\omega^2}{k_\|^2 v_{thi}^2}\right) \right] \right\}$$

The dispersion relation then is $$1 - \frac{\omega_*}{\omega} - \left(1 - \frac{\omega_{*i}}{\omega}\right) \frac{k_\|^2 v_s^2}{\omega^2} - i \frac{\sqrt{\pi}}{|k_\| | v_{the}} \left[ \frac{n_c}{n_i}(\omega - \omega_* + k_\| u_{e\|}) \right.$$
$$\left. + \frac{n_T}{n_i}(\omega - \omega_*) + \left(\frac{m_i}{m_e}\right)^{1/2}(\omega - \omega_{*i}) \exp\left(-\frac{\omega^2}{k_\|^2 v_{mi}^2}\right) \right] = 0$$

and to lowest order, for $$\omega_* > k_\| v_s$$

is $$\omega = \omega_* + \left(1 + \frac{T_i}{T_e}\right) \frac{k_\|^2 v_s^2}{\omega_*} - i \frac{\sqrt{\pi}\omega_*}{|k_\| | v_{the}} \left\{ \frac{n_c}{n_i} \left[ |k_\| u_{e\|}| \right. \right.$$
$$\left. - \left(1 + \frac{T_i}{T_e}\right) \frac{k_\|^2 v_s^2}{\omega_*} \right] - \frac{n_T}{n_i}\left(1 + \frac{T_i}{T_e}\right)\frac{k_\|^2 v_s^2}{\omega_*}$$
$$\left. - \left(\frac{m_i}{m_e}\right)^{1/2}\left(1 + \frac{T_i}{T_e}\right) \omega_* \exp\left(-\frac{\omega_*^2}{k_\|^2 v_{thi}^2}\right) \right\}$$

Therefore, for $$|u_{e\|}| > \left(1 + \frac{T_i}{T_e}\right) \frac{v_s^2 k_\|}{\omega_*}$$

a transfer of momentum from the circulating particles to the wave occurs, while the trapped electrons and the ions absorb momentum from the wave. Since $$en_c u_{e\|} = -J_\| \text{ and } n_c + n_T = n_i$$

the threshold for instability is the same as the one that would be obtained without separating the electrons into two populations; that is, $$\frac{J_\|}{en} > \left(1 + \frac{T_i}{T_e}\right) \left[\frac{k_\| v_s^2}{\omega_*} + \left(\frac{m_i}{m_e}\right)^{1/2} \frac{\omega_*}{k_\|} \exp\left(-\frac{\omega_*^2}{k_\|^2 v_{thi}^2}\right)\right]$$

For $$u_{e\|}/v_s \gg \left(1 + \frac{T_i}{T_e}\right) k_\| v_s/\omega_*$$

the rate of momentum transfer from the circulating electrons to the wave is roughly $$\frac{\partial P_\|}{\partial t} \approx k_\| N_k \sqrt{\pi} \omega_* \frac{u_{e\|}}{v_{the}} \frac{n_c}{n_o}$$

where $N_k$ is the effective occupation number; that is, $$N_k = \frac{k^2 \phi_k^2}{8\pi} \frac{\partial \epsilon}{\partial \omega_k}$$

and $\epsilon_0$ is the dielectric constant. The resulting resistivity, under the assumption that all of this momentum is transferred to the ions, is $$\eta_F = \sqrt{\pi}\left(\frac{N_k \omega_*}{n_c T_e}\right) \frac{m_e k_\| v_{the}}{e^2 n_o}$$

and, like the collisional resistivity, can be enhanced by a factor $n_o/n_c$. This conclusion does not take into account, however, that the presence of fluctuations may alter the particle orbits and make insignificant the distinction between trapped and circulating particles in the terms indicated previously.

Figure 8:
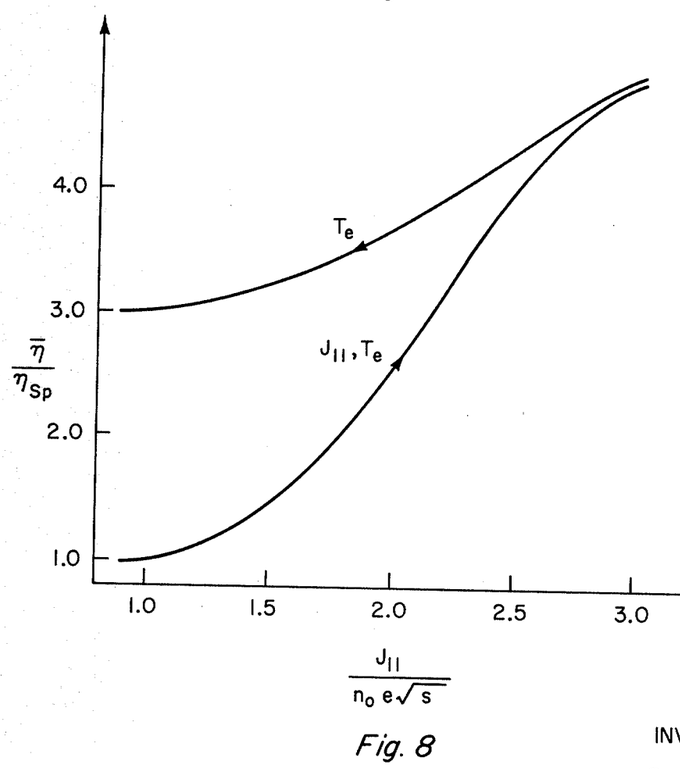
FIG. 8 is a graph of expected dependence of the ratio of measured resistivity $\eta$ to the Spitzer resistivity as a function of the ratio of the electron flow velocity to the ion sound velocity for an induced current that is raised up to the critical Kruskal-Shafranov and then kept constant at this limit.

Now a heating process is considered at constant density in which the current rises faster than $v_s$ during the first phase. Then the current is saturated at the Kruskal-Shafranov limit, but $$v_s \propto T_e^{1/2}$$

continues to increase up to the point where the ohmic heating is balanced by the thermal losses. Then the curve of the ratio of the total resistivity to the Spitzer resistivity as a function of $J_\|/(n_o e v_s)$, including fluctuations and trapped-particle effects, should be as indicated in FIG. 8. That is, the resistivity should undergo a hysteresis if, at high temperatures, separation of electrons into trapped and circulating ones occurs.

For a numerical estimate it is noticed that $$\frac{J_\|}{nev_s} \leq \frac{eB_T}{Rnev_s} \approx 1.5 \left(\frac{\epsilon}{0.75}\right)\left(\frac{B_T}{10^5}\right)\left(\frac{10^2}{R}\right)\left(\frac{10^{14}}{n}\right)\left(\frac{1 \text{ kev.}}{T_e}\right)^{1/2}$$

Therefore referring to Alcator, where $B_T = 1.2 \times 10^5$ G, and $R = 54$ cm. it follows that $$\frac{J_\|}{nev_s} \leq 3.4 \left(\frac{10^{14}}{n}\right)\left(\frac{1 \text{ kev.}}{T_e}\right)^{1/2}\left(\frac{\epsilon}{0.75}\right)$$

The condition for the existence of drift waves in the absence of temperature gradients is, roughly, $$\omega_* > k_\| v_s$$

where $$\omega_* = m^o c T_e/eBnr_o dn/dr$$

and $$k_\| v_s = (n^o/qR)(T_e/m_i)^{1/2}$$

where $m^o$ is the poloidal wave number, and $n^o$ the toroidal one. So the condition becomes $$\frac{m^o}{n^o} \frac{v_*}{\Omega_i r_o} > \frac{n}{qR}\left(\frac{dn}{dr}\right)^{-1}$$

and it involves relatively large values of $m^o/n^o$.

From the experimental point of view a hysteretic pattern as shown by FIG. 8 has not been observed or looked for thus far. One reason why the resistivity may not be settled at the large value $\bar{\eta}/\eta_{Sp\|}$, which is obtained from considering the separation of particles into trapped and circulating ones for $\omega_{e\|} < k_\| v_s$, is that this separation may not occur as a result of scattering processes type or of different type. Drift ballooning modes with odd microinstabilities can result from the presence of temperature gradients in the plasma, can have profiles of $\phi$ as indicated in FIG. 7, and can have frequencies equal to the average electron bounce frequency.

Accordingly, the Alcator device 101 discussed herein is adapted to reach very high plasma temperatures and maintain particle density of the order of $10^{14}$ per cubic centimeter by inducing a resistivity which is larger than the classical Spitzer resistivity. The deuterium gas is received within the annular cavity 8 and initial ionization to produce a plasma is provided by energy from a low power microwave source 32' tuned to a resonant cavity mode whose maximum electric field is in the center of the annular cavity 8. The microwave energy is introduced through a waveguide 14' that passes through an access port 43 to the cavity 8. An electron flow in the plasma, thereby formed, is produced by interaction between the air-core transformer 15 and the plasma, as before discussed. The electron flow velocity induced thereby is larger than the threshold velocity for the onset of anomalous resistivity but less than the thermal velocity. An air-core transformer to produce such an electron flow must be capable of delivering at least about 1.2 volt-second. Details of an air-core transformer able to supply the necessary 1.2 volt-second capability are included in later paragraphs, but first it is in order to give in one place a number of the parameters of the Alcator device described herein and this is done in Table 1 below.

TABLE 1

| | |
|---|---|
| Plasma current density ($j_{\parallel}$) | $1.4 \times 10^3$ a./cm.$^2$. |
| Plasma density | $1.2 \times 10^{14}$ particles/cm.$^3$. |
| Aspect ratio $R/a$ | 4.5 |
| Major radius $R$ | 54 cm. |
| Minor radius $a$ | 12 cm. |
| Poloidal field $B_p$ | 11.5 kg. |
| Toroidal field $B_T$ | 120 kg. |
| Electron temperature ($T_e$) | Up to 5 kev. |
| Toroidal coil 1 | |
|   Power | 21 mw. |
|   Plateau time | 200 milliseconds |
|   Current | 130 ka. |
|   Turns | 250 |
|   I.D. | 32.5 cm. |
| Air-core transformer 15 | |
|   Volt-second | 1.2 |
|   Excitation power | 6 mw. |
|   Stored energy | 6 mj. |
|   Maximum voltage | 20 kv. |
|   Turns | 300 |
|   Maximum voltage in plasma | 65 v. |
|   Vertical field in plasma | ± gauss |
|   Magnetic field | 140 kg. (maximum) |
|   Stress | 21,000 p.s.i. |
|   Average current density | $1 \times 10^4$ amperes/cm.$^2$. |

The air-core transformer 15 is shown consisting of two adjacent coils with a vertical separator therebetween. It is energized by a transformer excitation supply 19 to provide an electric current flow in the transformer and a field $B_p'$ encircled by the plasma in the cavity 8. The transformer, as before mentioned, comprises the coil 15 which acts as the primary, the plasma being the secondary thereof. At this juncture, the transformer energization current is terminated or caused to decay in a determined fashion by first opening the switch designated $S_1$ and by closing sequentially the switches designated $S_2$ and $S_3$, the transformer stored energy being dissipated in a resistance 21. The resistance values are chosen to cause controllable collapse of the transformer flux linking the plasma at a predetermined rate to induce the required electric current flow in the ionized gas forming the plasma. The resistance actually used is 0.4 ohms to dissipate 6 mega-joules of stored energy in the transformer in 15 to 20 milliseconds. The sequential steps followed are: first the energization of the transformer 15 by closing $S_1$ and a switch 52 to a three-phase power supply, thereby to energize the transformer system; next the switch 52 is opened and then $S_1$ is opened introducing the resistance 21 into the circuit and causing rapid decay of the excitation current and abrupt rise of a plasma current; next, and before complete collapse of the excitation current, $S_2$ is closed, removing most of the resistance 21 from the circuit, reducing the rate of collapse of said excitation current, and leveling off the plasma current; next the switch $S_3$ is closed to reduce further the excitation current collapse and maintain the level of plasma current, the induced current in the system passing, in each condition, through a free-wheeling diode 53. The switch $S_1$ must carry 40 ka. and hold off 20 kv. when it opens across the resistor 21. The switch actually used in Alcator is a vacuum breaker unit with three parallel vacuum contacts and commutation is accomplished by timed firing of a capacitance bank across the open contacts. Each winding, making up the coil 15 in FIG. 1, is made of a band-sawed spiral construction to supply the combination of strength and ampere turns necessary to deliver said 1.2 volt-second.

Figure 5:
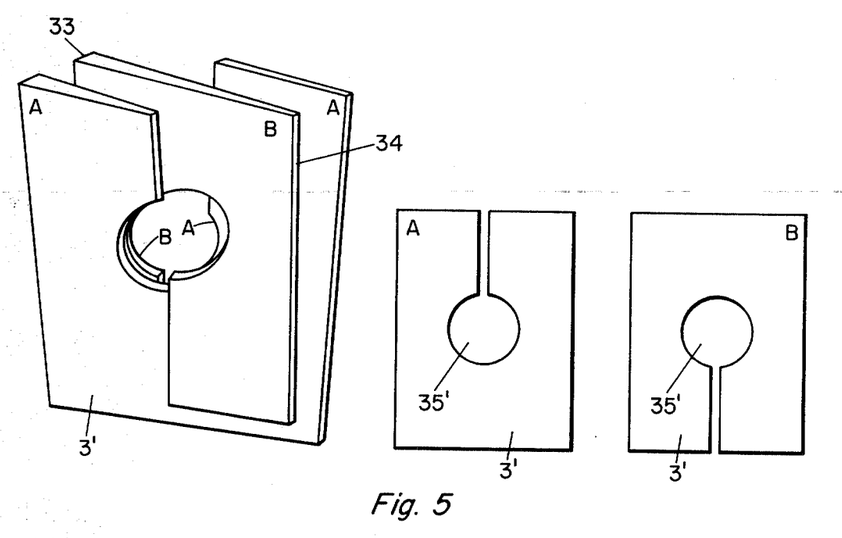
FIG. 5 shows copper Bitter-type plates of the type making up the single turn of FIG. 4.

The main toroidal coil 1 that furnishes the containing toroidal field $B_T$ is of Bitter-type construction, as before mentioned, and the central cavity (labeled 18' in FIG. 1) surrounds the annular housing shown at 28 which receives the gas and contains the plasma. The Bitter plates 3 are wedge-shaped, as best shown in FIG. 1, and of rectangular outline, as best shown in FIG. 3. The plates 3 are oriented to have the thick edge 33 of the wedge form the outer boundary of the annulus and the thin edge 34 of the wedge form the inner boundary thereof. Each of the plates 3 has a perforation 35 which in the assembled plates forms the central cavity 18' The Bitter plates are made of copper interleaved between similarly-shaped steel plates 10 adapted to carry the high stresses encountered in the device 101 at the very high magnetic fields necessary to establish an environment in which fusion can occur. The Bitter plates 3 would not withstand the mechanical forces (e.g., 80,000 p.s.i.) encountered in Alcator were it not for the interleaved steel plates 10, and the latter are dimpled, as indicated by the numeral 11, so that the steel plates act as springs to distribute the high stresses encountered under all thermal expansion conditions. Each turn of the coil 1, as shown in FIG. 4, is made up of a pair of steel plates 37 and between which a pair of copper Bitter plates 38 and 38' is sandwiched. An insulation plate 39 in each turn isolates that turn from adjacent turns in the coil 1. The shape of Bitter plates used in Alcator and the method of assembly therefor to provide a helical coil 1 is shown in FIG. 5. It should be noted, however, that the copper Bitter plates labeled 3' in FIG. 5 have elliptical perforations 35' (rather than the round perforations 35) to provide a cavity of elliptical cross dimensions to the gas. This ellipticity is another embodiment of the present device and would have the advantage of allowing higher current densities.

Access to the cavity 8 is allowed by ports 40, 41, 42, 43 and 44 which pass through openings between some of the assembled plates at spaced regions around the housing 28 for providing easy diagnostic accessibility. The Bitter plates adjacent to said regions are made thinner than at other portions of the device 101 to compensate for reduction of magnetic fields at the regions. The ports 42 and 41 (or similar ports) serve respectively as entry ducts for introducing the gas from a supply 46 to the chamber 8 and removing other gas therefrom initially to create a vacuum in the space. Also, in Alcator a vacuum is drawn in the space between the liner 4 and the stainless-steel shell 5 to prevent electrical breakdown of the ceramic break in the steel shell 5. The working elements in FIG. 1, as before mentioned, are contained within liquid nitrogen which is necessary for the high field operation so necessary to proper functioning of the device 101. The ports 40–44 are designed to permit passage through the dewar 27 and the liquid nitrogen without excessive heat loss and are, therefore, of special double-wall construction in the cryogenic region. Some of the ports 40–44 have removable sections for limited insertion and the chamber 8 is designed to eliminate windows at the $LN_2$ temperatures. In addition to the ports 40–44, access is allowed to the chamber 8 by oblique tubes 58 and 59.

A wave guide 14 permits the injection of microwave energy from a CW 80 kw. $3 \times 10^{12}$ Hz, microwave source 31 at an oblique angle to the axis of the chamber 8 for the purpose of inducing turbulence in the plasma during the period of high induced current in the plasma. The high density ($\simeq 10^{14}$ particles/cm.$^3$) of the Alcator plasma corresponds to an ion plasma frequency of the order of $3 \times 10^{12}$ Hz. and this frequency, in turn, corresponds with state of the art high energy microwave sources. The microwaves act to enhance the anomalous resistivity by a scattering action, as now explained.

The plasma within the chamber 8 contains circulating particles (electrons and ions) and trapped particles (electrons and ions) preferably in an equilibrium of about fifty percent circulating particles along the endless, symmetrical, circular equilibrium axis of the chamber 8. The microwave scattering acts upon the trapped particles and is important because those of the trapped particles that have their orbit lying at the outer edge of the plasma torus are subject to an unfavorable mangetic curvature and, at sufficiently high temperatures, can give rise to so-called trapped particle instabilities. Microwaves from the source 31 act to mix trapped particles so that they can experience also the favorable part of toroidal magnetic field $B_T$ toward the inner edge of the torus. The scattering rate must be larger than the growth rate of the trapped-particle source frequency.

Proper functioning of Alcator depends not only upon the creation of high mangetic fields, but it depends, also, among other things, upon proper distribution of such fields. Such proper distribution is accomplished, of course, to some extent by the design of coils 1 and 15, but there is provided, also, the compensation coils discussed in this paragraph. Two sets of compensation coils are used: one set is the transformer compensation means designated 16 in FIG. 2 and comprising compensating coils 63, 64, 65, 63', 64' and 65' in FIGS. 1 and 3; and the other set is the main coil compensation means designated 66 in FIG. 2 and comprising compensating coils 60, 61, 62, 60', 61', and 62' in FIGS 1 and 3. The compensating coils 60–62 and 60'–62' reduce any vertical field due to the helical nature of the coil 1. The compensating coils 63–65 and 63'–65 prevent (or reduce) the flux numbered 50 and 51, due to the field $B_p'$, from entering the plasma-containing cavity 8. The air-core system leads to particular problems in regard to coupling of the transformer to the toroidal coil 1 annd to the toroidal field compensation coils 60–62 and 60'–62'. To cancel the induced voltage effect without spoiling the overall compensation, a remote anti-transformer coil system 57 is employed in which equal and opposite flux linkages are induced in series with all coils linked to the main coil system of Alcator. The anti-transformer 57 comprises a coil 54 in series with the coil 1, a coil 55 in series with the transformer 15 and series compensating coil 16, and a coil 56 in series with the main coil compensation means 66. The coils 66 and 56 are energized by an electric power source 19'.

An attempt has been made in the foregoing explanation to include only those aspects of Alcator that are deemed to be important for an understanding of the mechanism in the belief that a certain amount of brevity herein will enhance rather than detract from understanding. Furthermore, the patents and journal articles incorporated by reference herein provide background and supplemental material. A few further details may be of interest, however. The copper shell 6 is split at 6'. The ends of the split section, as shown schematically in FIG. 2, can be connected together by closing a switch $S_4$ which is connected through coaxial conductors 7 and 7' and a resistance 21' to dissipate the magnetic energy associated with the plasma current $j_{1f}$. The three-phase input to the system is at 4160 volts. The system is operated in a pulse mode, the pulse being of four second duration including rise and fall times. Forty-four mega-joules are delivered to the main coil 1 and six mega-joules to the transformer 15. Selected turns in the coil 1 can be shorted by the switches shown schematically at 70' and 71 to provide a bumpy magnetic field $B_T$. Prior to introducing the deuterium, a vacuum is drown on the cavity 8 to the order of $10^{-8}$ torr by a combination of mechanical (and/or other) vacuum pumps 17 and cryoabsorption pumps 9. The deuterium is then introduced to provide a gas pressure of the order of $10^{-2}$ torr.

What is claimed is:

1. In a diffused pinch device of the tokamak type having poloidal and toroidal magnetic fields for confining a toroidal plasma column with a plasma current induced therein along an endless, circular equilibrium axis in an annular vacuum cavity, the improvement comprising:

(a) a toroidal magnetic field producing toroidal coil having turns around an annular vacuum cavity defined by plates formed into an annular configuration in the shape of conducting wedges of rectangular outline orientated to have thick edges forming the outer boundary thereof, and thin edges forming the inner boundary thereof, the plates being interleaved in a sandwiched configuration so that the annular vacuum cavity contains a toroidal plasma current carrying plasma column having microinstabilities therein; and (b) means for inducing a plasma current in the toroidal plasma column at an electric plasma current density for provoking microinstabilities that result in a mild plasma turbulence and a turbuent electrical resistivity that is greater than $2.5 \times 10^{-6}/T_e^{3/2}$ ohm-centimeter, where $T_e$ is the electron temperature expressed in kiloelectron volts;

the desired plasma turbulence setting in when the electron flow velocity, which is proportional to the electrical plasma current density divided by the particle number density, is smaller than the electron thermal velocity but larger than an appropriate threshold value, which is equal to or smaller than the ion sound-wave velocity, said ion sound-wave velocity being equal to the electron thermal velocity divided by the square root of twice the ratio of the mass of the plasma ions to the electron mass;

the toroidal plasma current carrying plasma column being imbedded in a toroidal magnetic field and having an aspect ratio of plasma column major radius to minor radius of less than five;

the combination of the toroidal magnetic field and aspect ratio of less than five acting to permit the inducing of the plasma currents without provoking instabilities that would destroy the toroidal plasma configuration, and said device being adapted to reach plasma temperatures of up to 5 kev. at plasma particle number densities of up to $10^{14}$ particles per cubic centimeter as a result of heating due to the induced plasma currents.

2. The devices as claimed in claim 1 in which the plasma in the toroidal plasma column forms the secondary of a transformer of which the primary is a coil magnetically coupled to the plasma to induce the plasma currents therein having microwave source means for providing further plasma resistivity and heating by the injection of microwaves into the plasma at a frequency below that which would create reflection therefrom, the heating involving the transfer of energy to the plasma from the transformer rather than from the microwave source means.

3. The device as claimed in claim 1 in which the toroidal magnetic field has a strength of 120,000 gauss in the annular vacuum cavity, and an air core transformer is disposed within the central hole of the annular vacuum cavity with a capability of delivering at least about 1:2 volt-second for providing the means for inducing the plasma current in the toroidal plasma column.

4. The device as claimed in claim 1 in which the toroidal magnetic field producing toroidal coil has insulated, plate-shaped wedge conductors and dimpled stainless steel plates interleaved therewith around the annular vacuum cavity to receive a gas that is ionized to a plasma and heated by the plasma current induced therein to form a plasma having a plasma current density of $1.4 \times 10^3$ a./cm.$^2$, a plasma density of $1.2 \times 10^{14}$ particles/cm.$^3$, an aspect ratio $R/a$ of 4.5, a major radium $R$ of 54 cm., and a minor radius $a$ of 12 cm. in a poloidal field $B_p$ of 11.5 kg. and a toroidal magnetic field $B_T$ of 120 kg. at an electron temperature of up to 5 kev., and the coil has stress hoops and second wedges around the outside thereof for containing the hoop stresses produced by the $B_T$ field, the dimpled stainless steel plates acting like springs to distribute the stresses encountered under the thermal expansion conditions produced in achieving the given parameters.

5. The device as claimed in claim 1 having a metallic shell that surrounds the toroidal plasma column with a meridian slit that can be shorted, and means for shorting the shell at predetermined times for the purpose of coupling magnetic energy out of the toroidal plasma column.

6. The device as claimed in claim 1 in which the annular plate-shaped conducting wedges of the coil are shaped to provide ports for accessibility to the toroidal plasma column, the thickness of the wedges varying to compensate for the reduction in the toroidal magnetic field that would otherwise occur at the ports.

7. The device as claimed in claim 1 in which the annular plate-shaped, conducting wedges have means for shorting the same to cause magnetic field ripples that increase the resistance of the plasma in the toroidal plasma column.

8. The device of claim 1 having trim coils around the outside of the toroidal magnetic field producing coil for cancelling unwanted fields and for preventing unwanted flux linking in the annular vacuum cavity.

9. The device of claim 1 having overlapping insulated copper wedges and means for cooling them to liquid nitrogen temperatures.

10. The device as claimed in claim 1 in which the toroidal magnetic field producing toroidal coil has turns formed from annular, plate-shaped, conducting wedges of rectangular outline defining elliptical perforations along the endless axis to provide a cavity of elliptical cross-section for the toroidal plasma column.

11. The device as claimed in claim 10 in which the plasma cross section is elliptical.

References Cited

UNITED STATES PATENTS

| | | | |
|---|---|---|---|
| 3,031,399 | 4/1962 | Warnecke et al | 176—2 |
| 3,156,621 | 11/1964 | Josephson | 176—1 |
| 3,692,626 | 9/1972 | Ohkawa | 176—3 |

OTHER REFERENCES

Plasma-Current Multipole Experiments, by T. Ohkawa et al., Physical Review Letters, vol. 22, April-June 1969, pp. 1275–1277.

Annual Review of Nuclear Science, vol. 20 (1970), an article by Post on pp. 571–573.

REUBEN EPSTEIN, Primary Examiner